July 29, 1930.   C. SCHMITZ   1,771,468
TWO-SPEED DRIVE FOR CENTRIFUGAL SEPARATORS
Filed Aug. 8, 1929   2 Sheets-Sheet 1
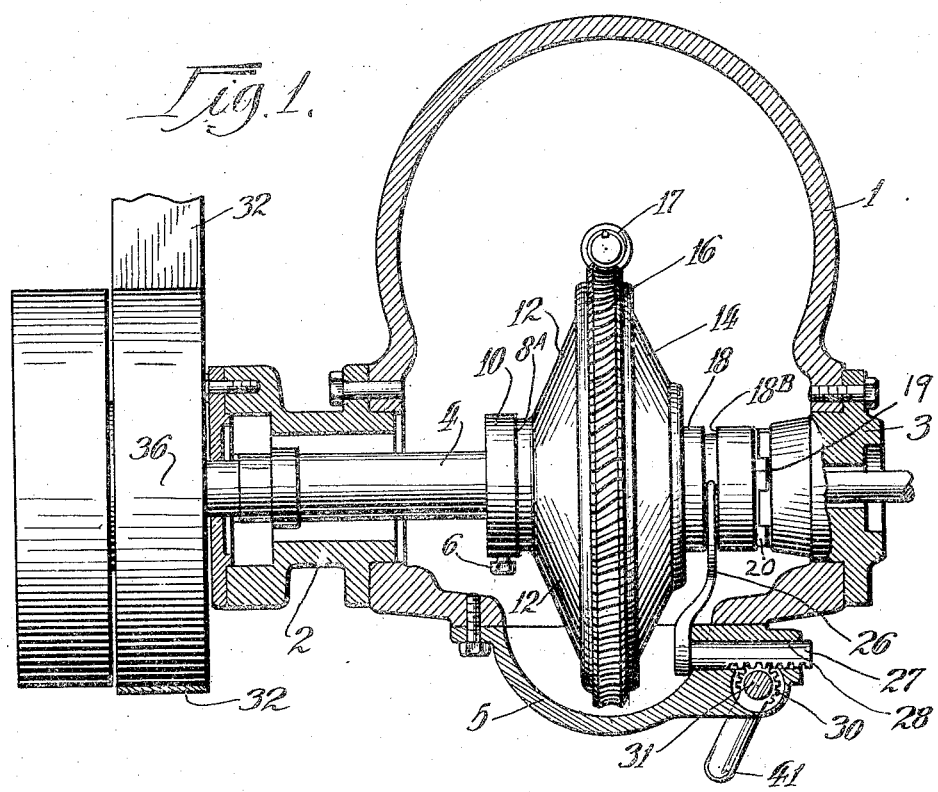
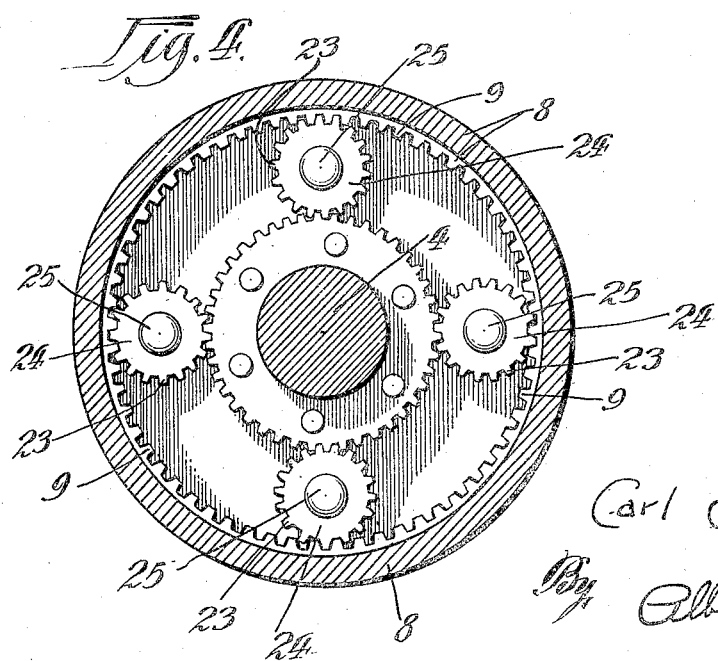
Inventor:
Carl Schmitz
By Albert Scheib
Attorney.

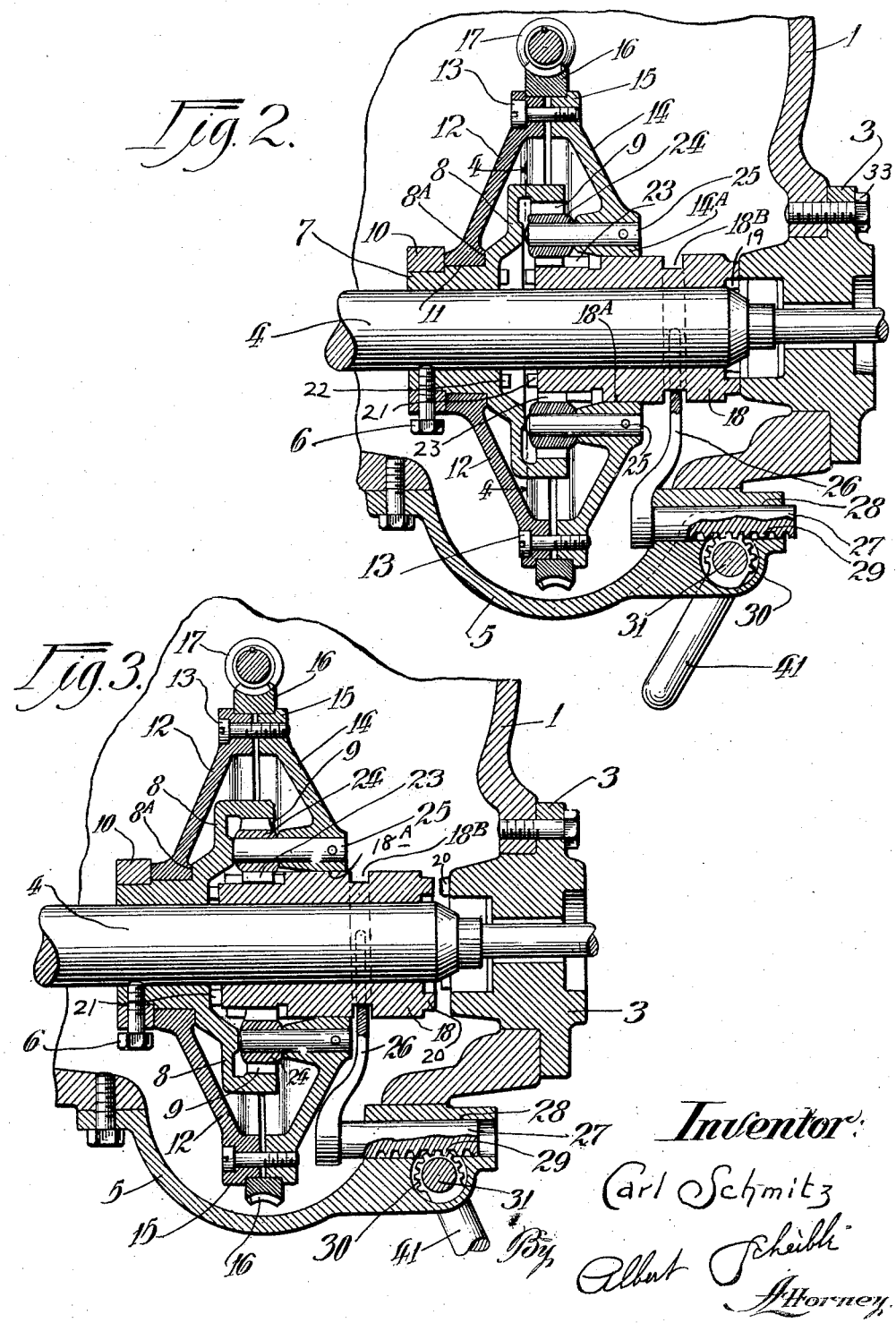

Patented July 29, 1930

1,771,468

UNITED STATES PATENT OFFICE

CARL SCHMITZ, OF OELDE, WESTPHALIA, GERMANY

TWO-SPEED DRIVE FOR CENTRIFUGAL SEPARATORS

Application filed August 8, 1929, Serial No. 384,448, and in Germany August 15, 1928.

My invention relates to a two-speed driving mechanism particularly adapted for centrifugal separators, and in its general objects aims to provide a self-lubricating, strong and simple driving mechanism adapted to afford two different speed ratios, and also aims to provide simple means for changing the operative connections between parts of the mechanism so as to change from one speed ratio to the other.

More particularly, my invention relates to worm drive types of speed increasing mechanisms, and to a mechanism of this type housed by a casing designed to contain oil so that all parts of the mechanism will effectively lubricate the action of certain parts in splashing up the oil. In this aspect, my invention aims to provide a planetary speed reducing gear partly housed by a worm wheel and operatively interposed between this worm wheel and a driving shaft carrying the worm wheel. It also aims to provide a novel arrangement of the constituent parts of the worm wheel and the speed-reducing gear, and further aims to provide simple speed-altering means for rendering the speed-reducing gear inoperative so as to connect the worm wheel rigidly with the driving shaft.

Furthermore, my invention aims to provide an arrangement for this purpose in which the speed-altering means are conveniently operable from outside the casing housing the worm drive, in which a bearing for the worm wheel is operatively latched to the casing when the speed-reducing gear is effective, and in which the same bearing is operatively latched to the shaft when the speed-reducing gear is inoperative.

Still further and also more detailed objects will appear from the following specification and from the accompanying drawings, in which Fig. 1 is a vertical section through parts of an appliance including a driving mechanism embodying my invention, taken along the axis of the pulley-driven driving shaft and showing the disposition of the parts when the planetary speed-reducing gear is operative.

Fig. 2 is an enlargement of a portion of Fig. 1, with most of the parts sectioned axially of the shaft.

Fig. 3 is a sectional view similar to Fig. 2, showing the disposition of parts of the mechanism when the control lever has been moved to render the planetary speed reducing means inoperative.

Fig. 4 is an enlarged vertical section taken at right angles to the axis of the shaft, along the line 4—4 of Fig. 2.

When centrifugal separators are used in dairies or the like, two decidedly different speeds are respectively required for cleaning milk and for separating cream from the milk. Likewise, the speed at which a separator of given construction is efficient for use in the manufacture of clear lacquers is decidedly different from that at which the same separator can be used efficiently in the preparation of pigment-containing lacquers. For both of these general purposes, the separators as now common in use include a worm drive housed by a casing, but afford only a single speed ratio between the driving shaft and the worm, so that the needed second speed ratio can not be secured unless a separate mechanism is provided (at considerable expense) for selectively altering the speed at which the driving shaft is rotated.

My present invention accomplishes this selective securing of two different worm speeds by providing a worm-ring carrier, speed reducing mechanism and control mechanism which can readily have its major parts housed by the usual main portion of the worm wheel casing of a centrifugal separator, and which will conveniently present a control lever outside this casing.

Illustrative of my invention, the drawings show a worm wheel casing comprising a main casing portion 1 supporting alined journals 2 and 3 for the drive shaft 4, and a casing bottom 5 detachably secured to the main casing portion.

Fastened to the shaft 4, as by a set screw 6, is a collar 7 which is fitted over a portion of the shaft. One end of this collar has an integral radial flange 8, from the peripheral portion of which flange an internal gear 9 extends longitudinally away from the collar 7. Fitted upon the other end of the collar 7 is a thrust ring 10, which is fastened to the collar, as for example by the aforesaid screw 6. The exterior portion 11 of the collar between the inner edge of the thrust ring and the inner face of the flange 8 is of smaller diameter than the thrust ring and is cylindrical.

Journaled on this collar portion 11 is a centrally perforated wheel plate 12 which has the opposite faces of its radially inner portion respectively guided by the inner end of the thrust ring 10 and by an annular face portion 8A of the said flange 8.

The radially outer portion of the wheel plate 12, which desirably flares away from the thrust ring 10, is fastened, as by bolts 13, to the radially outer portion of a second and oppositely flaring wheel plate 14 which has a hub 14A of larger bore than the diameter of the shaft 4. Each of the wheel plates 12 and 14 has a peripheral flange 15 adjacent to its outer face, so that the adjoined radially outer parts of the two wheel plates afford a peripheral wheel groove in which a worm ring 16 is seated, this worm ring being clamped between the two flanges 15 by the tightening of the bolts 13, so that the two flanged plates 13 and 14 together with the worm ring constitute a worm wheel which intermeshes with the usual worm 17.

Journaled on the shaft 4 and extending toward the flange 8 is a sleeve 18 which has its outer end provided with projecting teeth 19 adapted to be interposed between teeth 20 on the inner end of the journal 3, as shown in Fig. 1. The inner end of the sleeve 18 has another set of projections 21 adapted to be interposed between projections 22 formed on the collar 7 and projecting toward the said sleeve, and this sleeve has an intermediate and cylindrical peripheral portion 18A on which the hub of the said second plate 14 is journaled. The portion of the sleeve 18 between this journaling part 18A and the inwardly directed teeth 21 is formed with gear teeth affording an external gear 23. Interposed between this gear 23 and the internal gear 9 and meshing with both thereof are a plurality of planetary pinions 24, each journaled on a pinion shaft 25 which is carried by the hub 14A of the said second wheel plate.

The sleeve 18 is shorter than the distance between the projections 22 and the journal 3, and this sleeve is freely slidable on the shaft 4 between the two positions respectively shown in Fig. 1 and Fig. 2. To effect this sliding, I provide the sleeve 18 with a peripheral groove 18B entered by the arms of a fork 26, this fork being fast upon a stem 27 which slidably fits a bore 28 in the casing bottom 5, the bore 28 being parallel to the axis of the shaft 4. This stem 27 has rack teeth 29 formed along one edge and meshing with a control pinion 30 which is fastened to a control shaft 31 and a control handle 41. The control shaft 31 has its axis at right angles to that of the shaft 4, and the handle 31 is disposed outside the aforesaid casing, for convenient reach by the operator of the appliance equipped with my mechanism.

The drive shaft 4 is driven from any convenient source of power, as for example through a belt 32 driving a pulley 36 fastened to this shaft outside the said casing.

When the control handle 31 is in the position shown in Figs. 1 and 2, the outer end projections 19 on the slidable sleeve 18 are interposed between the projections 20 on the journal 3 (which journal is fastened to the main casing portion 1 by bolts 33), so that this sleeve cannot rotate; and the projections 21 at the inner end of the sleeve are freely spaced from the adjacent projections 22 on the collar 7, so that this collar is free to rotate with respect to the sleeve. During this rotation of the collar 7 (which is fastened to the shaft 4) the internal gear 9 and the gear 23 on the sleeve cooperate with the pinions 24 to afford a planetary speed-reducing mechanism, so that the second wheel plate 14 (to which the worm ring 16 is clamped) rotates at a considerably lower rate than the rate of rotation of the driving shaft 4.

However, when the control handle 31 is swung to the position shown in Fig. 3, the sliding of the fork stem effected through the control pinion 30 and the rack teeth 29 has moved the fork 26 longitudinally of the shaft 4, so that the sleeve 18 has its end projections 19 disengaged from the journal projections 20 and projections 21 are interposed between the projections 22 on the collar 7 which is fastened to the drive shaft. Consequently, the entire worm wheel assembly, together with the planetary pinions and the sleeve 14 rotate as a unit with the driving shaft 4, thereby serving as a substitute for the ordinary worm wheel fastened to such a shaft.

In practice, I desirably form the casing so that its bottom part 5 is substantially cup-shaped and relatively near the worm ring, while elevating the top portion of the casing considerably above the top of the worm ring. By so doing, I readily secure an effective lubrication of my mechanism by merely providing oil in the casing bottom, from which this oil is then splashed by the teeth of the worm ring. Some of this splashed oil will work into the interior of the worm wheel both along the drive shaft and at the bore of the hub 14A, thereby affording the needed lubrication for the gears.

Thus arranged, the worm ring 16 together with the two worm plates 13 and 14, the thrust ring 10, the collar 7 and its flange and internal gear, and the sleeve 18, can all be inserted in the main casing portion 1 as a unit; and likewise can be removed as a unit from the casing for inspection or cleaning. When this mechanism unit is thus removed, a detaching of the screws 13 permits ready access to the gears and pinions, and also permits the interior of the worm wheel to be cleaned.

In the arrangement thus described, it will be noted that the worm wheel effectively forms a housing for the planetary gearing and also supports the shafts for the planetary pinions. Also, that the sleeve (which has a toothed portion forming part of the planetary gearing) extends into this housing, so that I secure an unusually compact as well as easily manufactured construction. It will also be noted that the engagement of the control fork arms with portions of the groove in the sliding sleeve prevent the stem of the control fork from rotating, so that I require no auxiliary provisions for this purpose. Furthermore, it will be noted that the sliding sleeve serves the double purpose of affording the central gear of the planetary mechanism and of latching this gear against rotation with respect to the internal gear of the same mechanism; and that by making the gear teeth 23 on this sleeve of suitable length I permit the sliding of the sleeve while continuously keeping its gear teeth intermeshed with the planetary pinions.

However, while I have described my invention in an embodiment including numerous advantageous details of construction and arrangement, I do not wish to be limited in these respects, since changes may obviously be made without departing either from the spirit of my invention or from the appended claims.

Neither do I wish to be limited to the employment of my invention in connection with an apparatus for a particular purpose, although it is particularly suitable for use with commercial types of centrifugal separators in which the assembly shown in the drawings can easily be substituted for the present single speed drive.

I claim as my invention:

1. In a worm drive mechanism, a rotatable shaft; a bearing member in which the shaft is journaled; an external gear member slidable and rotatable on the shaft, the external gear member and the bearing member having coacting formations adapted to interlock when the said gear member is slid against the bearing member; an internal gear member fast upon the shaft and having its gear teeth overhanging the external gear member; two side plates respectively journaled on the two gear members; planetary pinions journaled on axes parallel to the axis of the shaft on the side plate which is journaled on the external gear member and continuously meshing with both gear members; and a worm wheel jointly supported by the two side plates; the internal gear member having a formation adapted to interlock with the external gear member when the latter is slid away from the said bearing member.

2. In a worm drive mechanism, a driving shaft, an internal gear member fast thereon, an external gear member slidable on the shaft, a hollow worm wheel comprising two side plates respectively journaled on the two gear members, and planetary pinions rotatably mounted on the worm wheel, the said pinions meshing with both of the said gear members and a housing for the mechanism, the housing and the external gear member having opposed formations disposed so as to be on the shaft, whereby to lock the external gear member against rotation.

3. A worm drive mechanism, as per claim 1, including a thrust ring fastened to the internal gear member and engaging one face of the side plate which is journaled on the internal gear member, the latter member having a shoulder engaging the other face of the same side plate.

4. In a worm drive mechanism, a rotatable shaft, a stationary member adjacent thereto, an external gear member slidable and rotatable upon the shaft, an internal gear member fastened to the shaft at the opposite side of the external gear from the stationary member, a worm wheel journaled upon one of the gear members, and planetary pinions journaled upon the worm wheel on axes parallel to that of the shaft and continuously meshing with both of the gear members; the internal gear member and the stationary members having opposed projections, and the external gear member being adapted to interlock with the projections on either the internal gear member or the stationary member when the external gear is slid in one or the opposite direction longitudinally of the shaft.

5. In a worm drive mechanism, a rotatable shaft, an external gear member slidable and rotatable upon the shaft, an internal gear member fastened to the shaft; a worm wheel comprising two side plates respectively journaled on the two gear members, and a worm wheel jointly supported by and fastened to the side plates; planetary pinions journaled on one of the side plates on axes parallel to that of the shaft and continuously meshing with both gear members; coacting means on the two gear members for interlocking the gear members against rotation when the external gear member is slid in one direction along the shaft, and stationary means for locking the external gear member against rotation when the external gear member is slid along the shaft in the opposite direction; the planetary pinions and the toothed portions of the internal gear member being continuously housed between the two side plates.

Signed at Oelde, in Westphalia, Germany, July 20, 1929.

CARL SCHMITZ.